United States Patent
Tus et al.

(10) Patent No.: US 10,394,916 B2
(45) Date of Patent: Aug. 27, 2019

(54) PERSONALIZED SEARCH ENVIRONMENT

(71) Applicant: MICROSOFT TECHNOLOGY LICENSING, LLC, Redmond, WA (US)

(72) Inventors: Alan Tus, Oslo (NO); Konstantin Seleskerov, Oslo (NO); Panos Sakkos, Oslo (NO); Rovin Bhandari, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 15/263,674

(22) Filed: Sep. 13, 2016

(65) Prior Publication Data

US 2018/0075148 A1    Mar. 15, 2018

(51) Int. Cl.
*H04L 29/06* (2006.01)
*G06F 16/9535* (2019.01)

(52) U.S. Cl.
CPC ......... *G06F 16/9535* (2019.01); *H04L 63/08* (2013.01); *H04L 63/102* (2013.01)

(58) Field of Classification Search
CPC .. G06F 17/30867; H04L 63/08; H04L 63/102
See application file for complete search history.

(56) References Cited

U.S. PATENT DOCUMENTS

2013/0198085 A1    8/2013 Li et al.
2016/0142758 A1    5/2016 Karp et al.

FOREIGN PATENT DOCUMENTS

| EP | 3051441 A1 | 8/2016 |
|---|---|---|
| WO | 2008137563 A2 | 11/2008 |
| WO | 2016126564 A1 | 8/2016 |

OTHER PUBLICATIONS

Bruno Terkaly—NPL Mar. 2014.*
Ronnie Holm—NPL 2015.*
Rick Rainey—2014 NPL, obtained date: Dec. 7, 2018, obtained from https://www.red-gate.com/simple-talk/cloud/security-and-compliance/azure-active-directory-part-1-an-introduction/ (Year: 2014).*
Bruno Terkaly (2015 NPL) (Year: 2015).*
Roe, David, "Microsoft Delve is Nice, but are Other Options Better?", Published on: Nov. 7, 2014 Available at: http://www.cmswire.com/cms/information-management/microsoft-delve-is-nice-but-are-other-options-better-027098.php.

(Continued)

*Primary Examiner* — Tri M Tran
(74) *Attorney, Agent, or Firm* — Liang IP, PLLC

(57) ABSTRACT

Technologies are described to provide a personalized search environment to users without requiring enterprise environment access. Upon access of a personal service account such as one in a productivity service, a user's personal environment may be created by an aggregation service using graph based data infrastructure. Sources of information may include personal email accounts, calendars, social/professional networks, task list applications, online data storage services, health applications, gaming applications, and communication applications associated with the user. A personalized search application may then use the data from the aggregation service and/or (if available) user's enterprise account information to perform personalized searches with relevant results for the user.

20 Claims, 7 Drawing Sheets

(56) References Cited

OTHER PUBLICATIONS

"Spotfire software", Retrieved on: Jun. 22, 2016 Available at: http://www.wallpapercoc.com/spotfire-software-free-download.
Nt, Baiju, "Top Business Intelligence (BI) tools in the market", Published on: Jul. 25, 2014 Available at: http://bigdata-madesimple.com/top-business-intelligence-bi-tools-in-the-market/.
"CloudLock", Published on: Jan. 20, 2015 Available at: http://www.appscare.com/solutions/google-apps-for-work/third-party-apps/cloudlock/.
Bruno, Terkaly, "Microsoft Azure—Enhance Data Exploration with Azure Search", In Microsoft Developers Network Magazine,vol. 30, Issue 3, Mar. 2015, 11 Pages.
Patrick, Guimonet, "Office365 What's New for Developers in 2015 and Beyond", Retrieved from <<https://yos365.wordpress.com/2015/07/22/office365-whats-new-for-devlopers-in-2015-and-beyond/>> Jul. 22, 2015, 19 Pages.
Ronnie, Holm, "Bugfree Consulting-Querying Azure Active Directory through Azure Graph API with F#", Retrieved from <<http://bugfree.dk/blog/2014/08/15/querying-azure-active-directory-through-graph-api-with-fsharp>> Aug. 15, 2014, 11 Pages.
"International Search Report and Written Opinion Issued in PCT Application No. PCT/US2017/050371" ,dated Nov. 28, 2017, 13 Pages.

* cited by examiner

PERSONALIZED SEARCH ENVIRONMENT

BACKGROUND

Cloud based service personalized search service provide a much more efficient and powerful search experience to users than conventional search engines. Using graph based aggregation services, some personalized search services use users' local storage, organizational data stores, users' history, other users' histories, and comparable parameters to determine relevant search results for a user. Such personalized search services are limited to enterprise environments, however, allowing users with access to the enterprise environment to perform searches using the enterprise's graph based aggregation service as backbone. Thus, for "consumer" type users without the underlying architecture, personalized search services are either not available or inefficient.

SUMMARY

This summary is provided to introduce a selection of concepts in a simplified form that are further described below in the Detailed Description. This summary is not intended to exclusively identify key features of essential features of the claimed subject matter, nor is it intended as an aid in determining the scope of the claimed subject matter.

Embodiments are directed to providing a personalized search environment to users through their personal accounts. According to some examples, a request to perform a search for a user may be received based on the user's personal account credentials through a service. The user may be authenticated through the service and the search request may be forwarded to a personalized search application using a tenant identifier assigned to all users of the service with personal accounts. Performance of the search may be enabled through an aggregation service associated with the service, where the aggregation service maintains relevancy information for the user based on a plurality of resources associated with the user. Search results may then be provided to the user.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
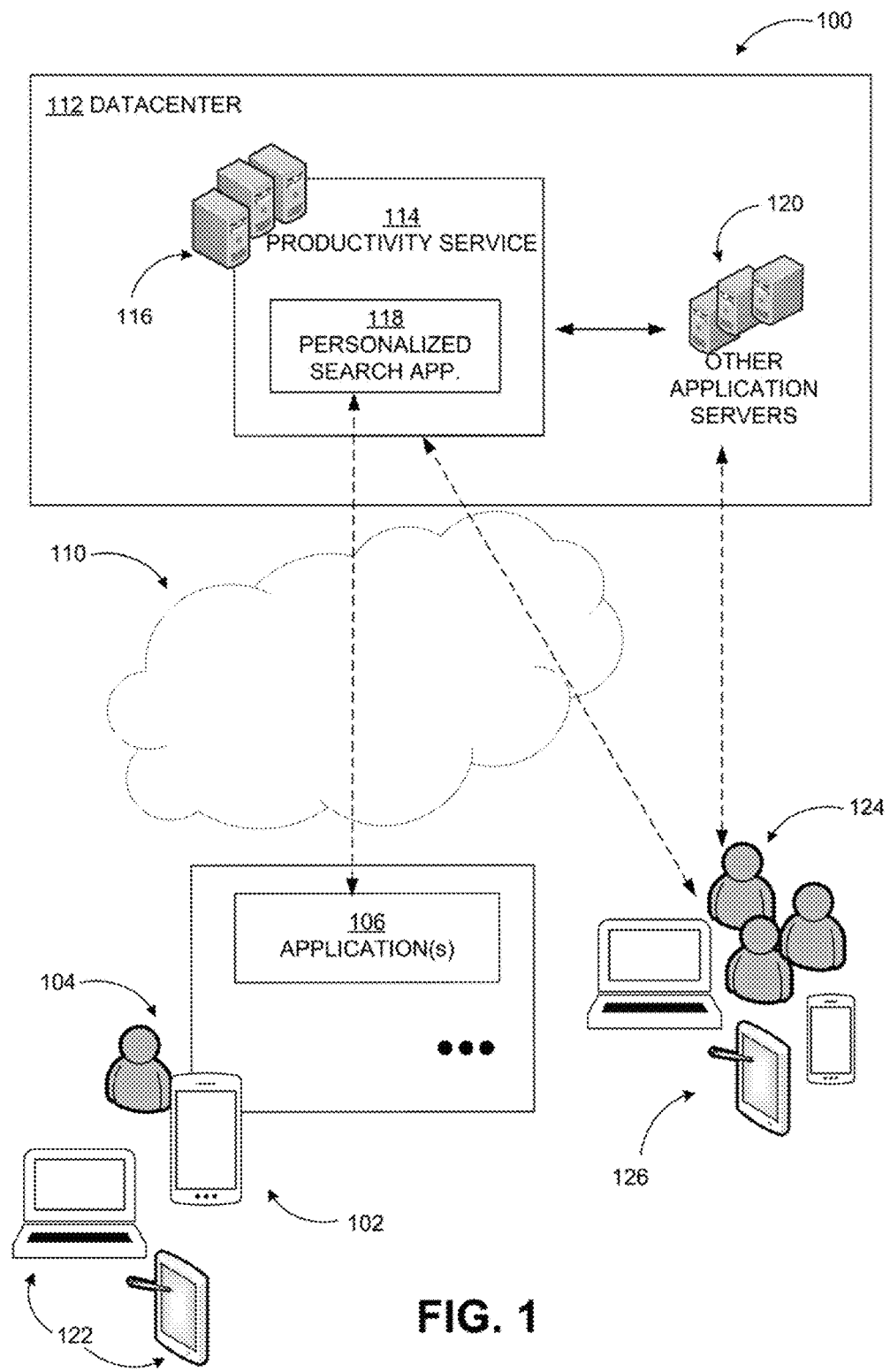
FIG. 1 is a conceptual diagram illustrating an example system to provide personalized search environment to users without requiring enterprise environment access, according to embodiments.

As briefly described above, upon access of a personal service account such as one in a productivity service, a user's personal environment may be created by an aggregation service using graph based data infrastructure. Sources of information may include personal email accounts, calendars, social/professional networks, task list applications, online data storage services, health applications, gaming applications, and communication applications associated with the user. A personalized search application may then use the data from the aggregation service, and/or (if available) user's enterprise account information to perform personalized searches with relevant results for the user.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also, be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide personalized search services. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart, phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example system to provide personalized search environment to users without requiring enterprise environment access, according to embodiments.

As illustrated in diagram 100, an example system may include a datacenter 112 hosting a cloud-based productivity service 114 configured to provide productivity applications such as word processing, spreadsheet, presentation, communication, collaboration, and comparable ones that may be accessed across multiple devices and users. The datacenter 132 may include one or more processing servers 116 configured to execute the productivity service 114, among other components. In some embodiments, at least one of the processing servers 116 may be operable to execute a personalized search application 118, where the personalized search application 118 may perform searches in user's personal and enterprise environments based on a aggregation service backbone, which may use graph based infrastructure to maintain data points and relationships between data and users. The datacenter 112 may also include one or more other application servers 120 configured to provide complementary services and work in conjunction with the productivity service 114 such as data storage services. As described herein, the productivity service 114 and/or the predictive engine may be implemented as software, hardware, or combinations thereof.

In some embodiments, the productivity service 114 may be configured to intemperate with various applications. For example, as illustrated in the diagram 100, a user 104 may execute a thin (e.g., a web browser) or a thick (e.g., a locally installed client application) version of an application 106 through the device 102 with which the productivity service 114 may be configured to integrate and interoperate with over one or more networks, such as network 110. The application 106 may be an application hosted by the productivity service, such as a word processing or spreadsheet client, for example. The device 102 may include a desktop computer, a laptop computer, a tablet computer, a vehicle mount computer, a smart phone, or a wearable computing device, among other similar devices. A communication interface may facilitate communication between the productivity service 114 and the application 106 over the network 110.

Some of the actions and/or processes described herein have been illustrated from the perspective of a server (for example, the processing servers 116 configured to execute the productivity service), however the same actions may be performed similarly by a client (for example, the application 106), among other entities. Additionally, some of the actions and/or processes described herein have been illustrated from the perspective of the client, however the same actions may be performed similarly by the server.

Conventionally, enterprise environments include information sources such as directory servers, interconnected cloud data storage services, communication services, productivity services, and comparable ones. When an enterprise member performs a search an aggregation service using those resources and aggregating data in a graph based format, where data points (documents, other forms of data, users, etc.) are nodes and relationships between the data points are reflected as edges connecting the nodes, may provide highly relevant search results to a personalized search application/service. The same resources may not be available for "consumer" type users who have personal accounts for certain services, but not necessarily a similar powerful background architecture.

Embodiments are directed to providing a personal environment for such "consumer" type users based on information from a variety of sources such as personal email accounts, calendars, social/professional networks, task list applications, online data storage services, health applications, gaming applications, and communication applications associated with the user. Thus, the user may have access to efficient and relevant personalized search results without having to have access to an enterprise account and the infrastructure associated with it.

Embodiments, as described herein, address a need that arises from very large scale of operations created by software-based services that cannot be managed by humans. The actions/operations described herein are not a mere use of a computer, but address results of a system that is a direct consequence of soft ware used as a service offered in conjunction with large numbers of devices and users storing, searching, and/or sharing content both locally at client devices and remotely at cloud-based services.

Example embodiments are described using a productivity or similar services herein. Embodiments are not limited to specific services or applications and may be implemented with any hosted service or application using the principles described herein.

Figure 2:
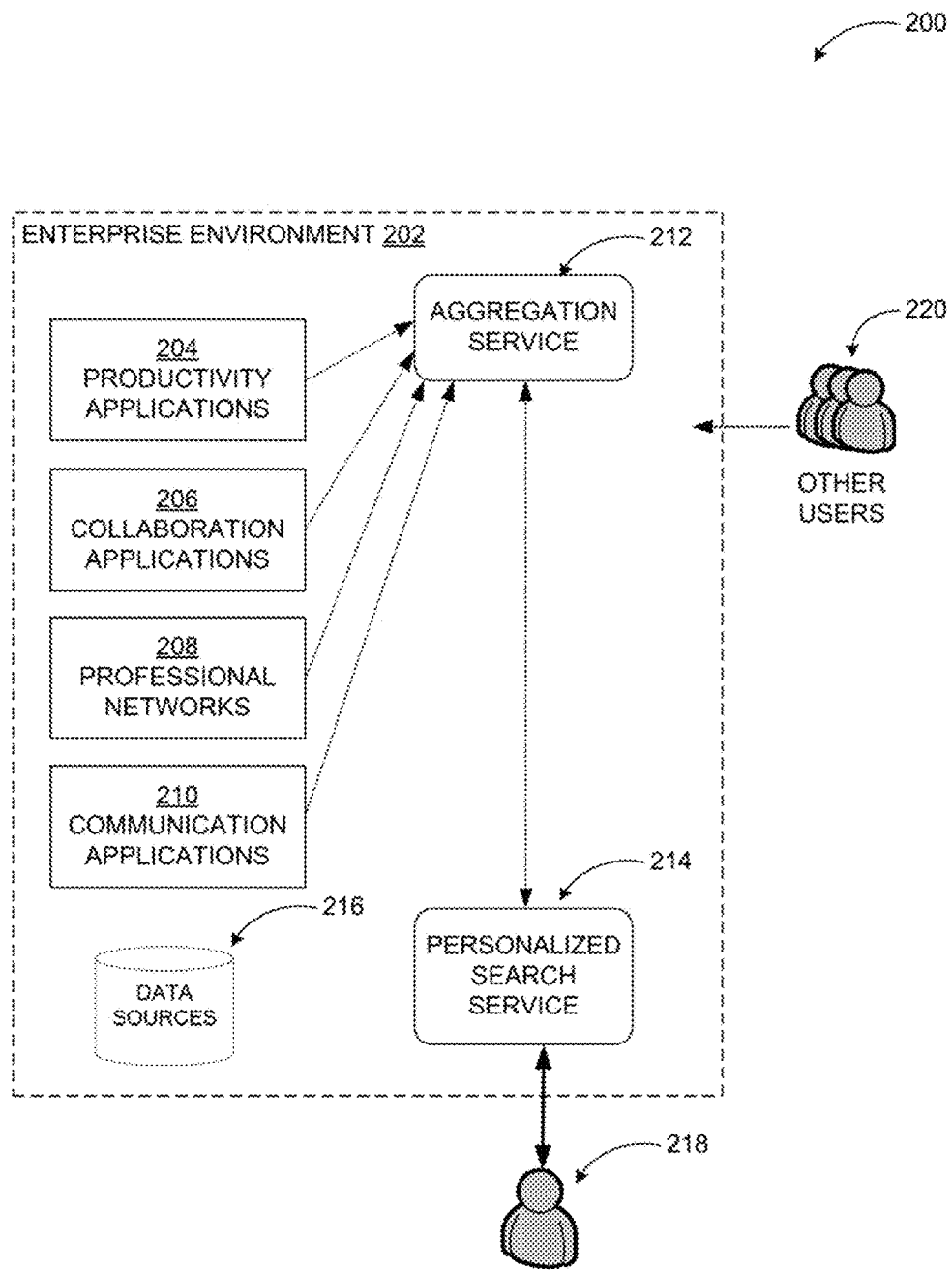
FIG. 2 is a display diagram illustrating major components in an enterprise environment personalized search.

FIG. 2 is a display diagram illustrating major components in an enterprise environment personalized search.

As shown in a diagram 200, an enterprise environment 202 may include productivity applications 204, collaboration applications 306, professional networks 208, communication applications 210, and other comparable-applications and services. The enterprise environment 202 may also include one or more data sources 216 such as cloud based data storage services, shared local data sources, etc. Some or all of these resources may be used to perform personalized searches for a user 218 by a personalized search service 214 such as Delve® by MICROSOFT CORPORATION of Redmond, Wash. The personalized search service may take advantage of capabilities of an aggregation service 212, which may aggregate data in a graph based format, where data points (documents, other forms of data, users, etc.) are nodes and relationships between the data points are reflected as edges connecting the nodes. Thus, the personalized search service 214 may provide highly relevant search results to the user 218.

One of the enhanced features of a personalized search service in an enterprise environment may include information associated with other users 220 in the enterprise environment. For example, when searching for a template for a report, the search service may receive data from the aggregation service associated with templates used by other users with similar organizational status as the user 218, the user's peers, supervisors, etc. Thus, search process may be enhanced by focusing the search environment to not only the user herself but also to other like the user. This may allow a broader base for the search results while preserving relevancy to the user. However, as mentioned above, the capabilities discussed above are dependent on enterprise environment components such as an email service, a directory service, enterprise data storage or collaboration services, and so on.

Figure 3:
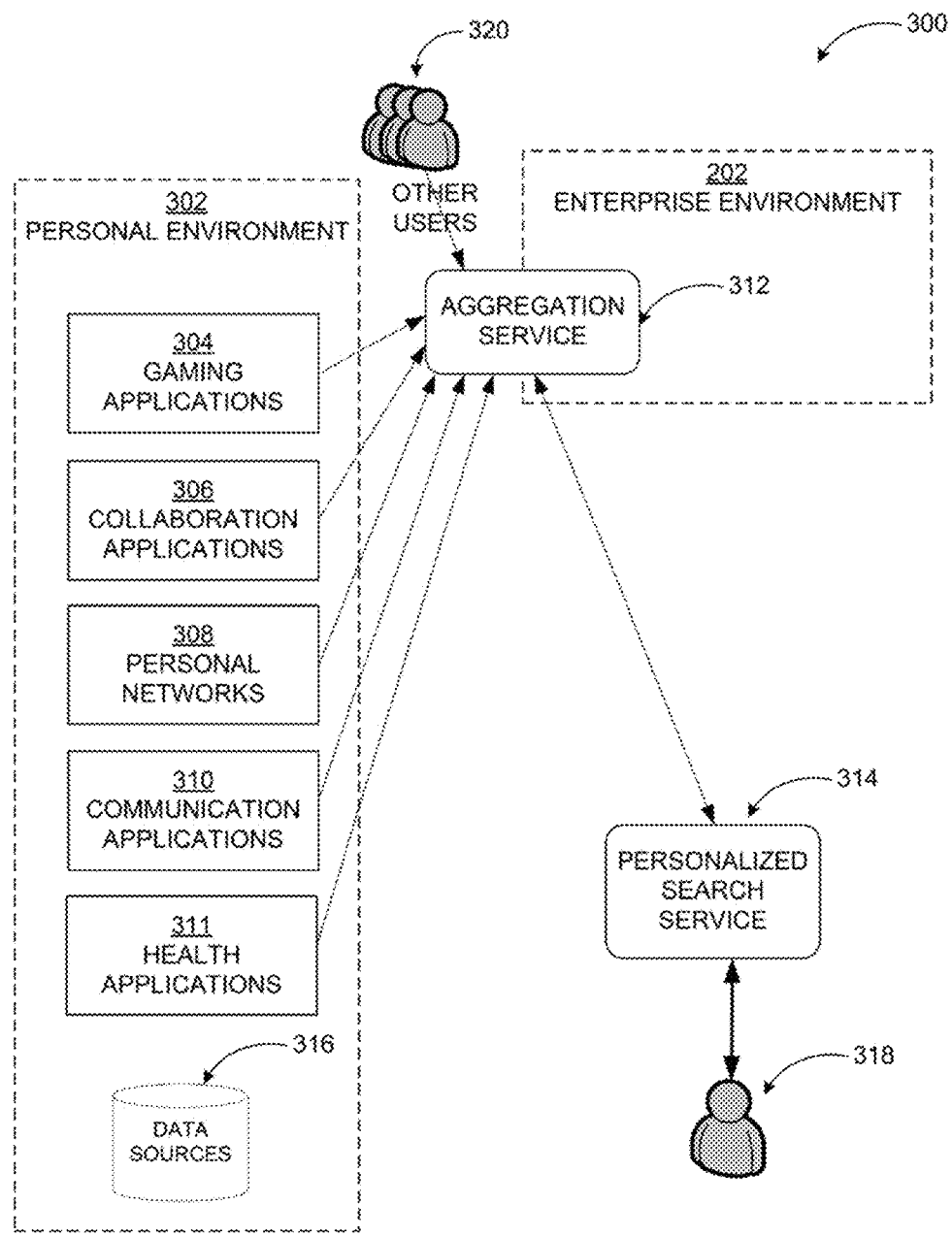
FIG. 3 is a display diagram illustrating major components in a non-enterprise environment personalized search, according to embodiments.

FIG. 3 is a display diagram illustrating major components in a non-enterprise environment personalized search, according to embodiments.

Diagram 300 shows a personal search environment 302 for a user 318 that may be used by a personalized search service 314. As the user 318 does not have the established infrastructure of an enterprise environment, a personal search environment may be created for the user by the personalized search service 314 or by the aggregation service 312 upon user 318 signing up for a service like a productivity service or any online service for that matter. Data associated with the user (documents, history of usage, connected/related people, etc.) may be collected from a variety of resources such as gaming applications 304, collaboration applications 306, personal networks 308, communication applications 310, health applications 311 (e.g., wearable device based health monitoring and feedback services), and online data storage services.

Collected data may be stored In a graph based format as discussed above and made available to personalized search service 314 by the aggregation service 312. In many cases, some or all of the applications/service the user has personal access to, may provide similar services to other users 320. Thus, user's connections and groups of people relevant to the user may be determined from information provided by those applications/services too. Therefore, a personalized search with broad based and focused at the same time rendering relevant, personal results to the user 318 may be performed without the need for the enterprise infrastructure.

If user 318 has access to an enterprise environment 202, search environment may be expanded to include the enterprise environment as well. The aggregation service 312 may be part of a service the user has access too, or it may be a standalone service communicating with other services associated with the user 318. In one example, while an enterprise environment search service may limit its operations to contacts of the user within the enterprise environment, in a system according to some embodiments, a user's personal contacts from social networks, various email services, collaboration services, and other applications may all be included in the search environment and used to form the graph based data infrastructure for the user.

Figure 4:
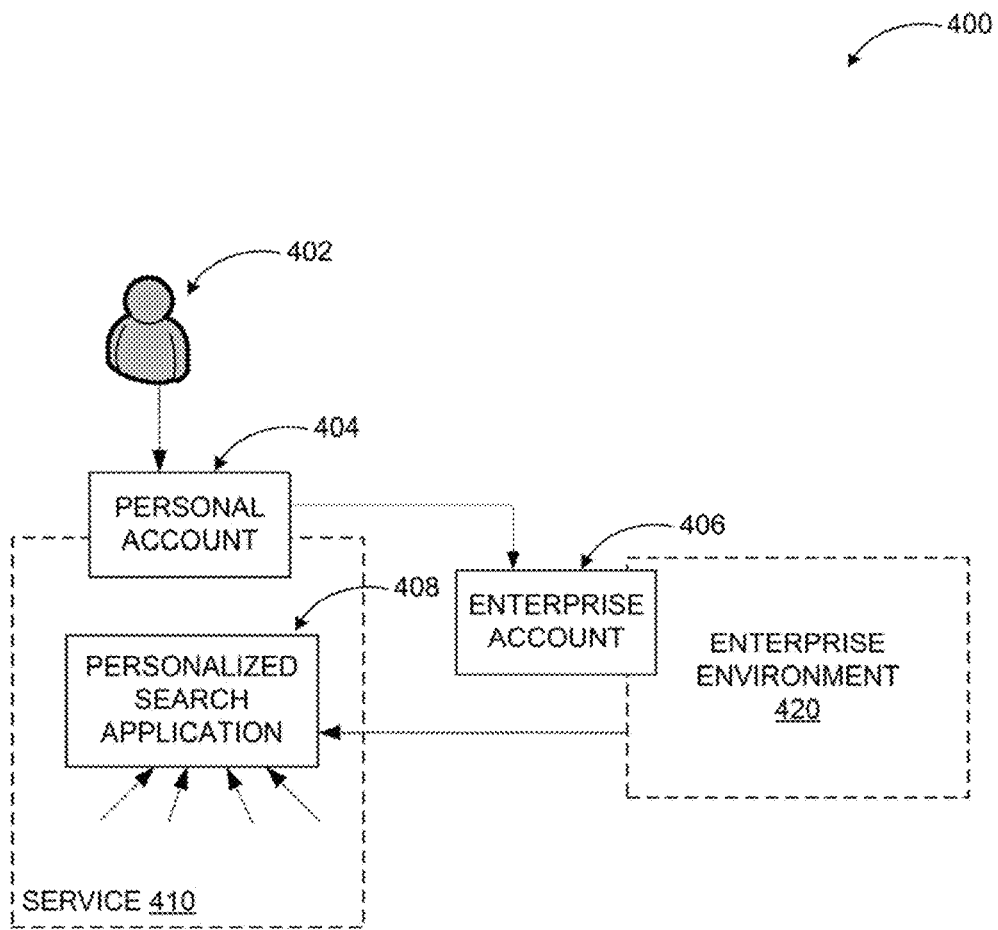
FIG. 4 is a display diagram illustrating example user access to personalized search through personal account, according to embodiments.

FIG. 4 is a display diagram illustrating example user access to personalized search through personal account, according to embodiments.

In a practical scenario, a user may have access to an enterprise environment 420 (e.g., through a work account) and also have a personal account with an online service such as a productivity service or other services. It is common for users to have an account associated with their operating system that allows them to synchronize applications and other configurations among multiple devices. Such accounts may be used to access a number of online services too. As discussed above, enterprise environments provide the infrastructure for enhanced personalized searches, but those are limited to their members only. Aggregation and personalized search applications are typically provided with a tenant identifier. Thus, the user is associated with the tenant identifier for the corresponding enterprise environment through their enterprise account (credentials) and has access to those services based on the tenant identifier. For personal accounts, there may not be any tenant identifier preventing provision of the same services to the user for their personal account.

In a system according to embodiments, personal accounts of users of a service (e.g., operating system provider's service, a productivity service, a collaboration service, etc.) may be associated with a single tenant identifier by that service provider. Thus, all the "consumer" type users associated with that service may be treated like member of an enterprise. When accessing a personalized search application, user 402 may be asked if they want to sign in using the enterprise account 406 or personal account 404. Upon selection of the personal account 404, the personalized search application may perform an authentication process that involves a personalized search application secret. The authentication parameters may include a client identifier (search application), a redirect link (link to the online personalized search application), a scope, and a response type in some examples.

In some examples, a personalized search application client application may start the flow by directing the resource owner's user, agent to the account authorization endpoint of the service provider for the operating system, productivity service, collaboration, service, etc. An authorization server may then authenticate the resource owner via a user agent, and establish whether the resource owner grants or denies the client's access request. Assuming that the resource owner has granted access, the account authorization server of the service provider may redirect the user agent to the personalized search application site. The user agent may call the client with the redirection URI, which may include an authorization code and any local state that was provided by the client.

The personalized search application may request an access token from the authorization server's token endpoint by using its client credentials for authentication, and include the authorization code that was received in the previous step.

The client may include the redirection link that was used to obtain the authorization code for verification. An example request URL may have the following format:

POST https: login.service.com/authentication-token.srf
Content-type: application/x-www-form-urlencoded
client_id=SearchService&redirect_uri=https://SearchService.Service.com&client_secret=SEARCHSERVICE_SECRET&code=AUTHORIZATION_CODE&grant_type=AU THORIZATION_CODE The account authorization server of the account service may validate the client credentials and the authorization code, and ensure that the redirection link that was received matches the link that was used to redirect the client. If the credentials are valid, the authorization server may respond by returning an access token.

Thus, user 402 may access personalized search application 408 through their personal account 404 credentials under an umbrella service 410 and provide enhanced, relevant, personalized search results. In other embodiments, the search may be complemented based on results from the enterprise environment 420 is the user 402 has also enterprise account 406 credentials.

The example scenarios and schemas in FIG. 1 through 4 are shown with specific components, data types, and configurations. Embodiments are not limited to systems according to these example configurations. Personalized search environment to users without requiring enterprise environment access may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
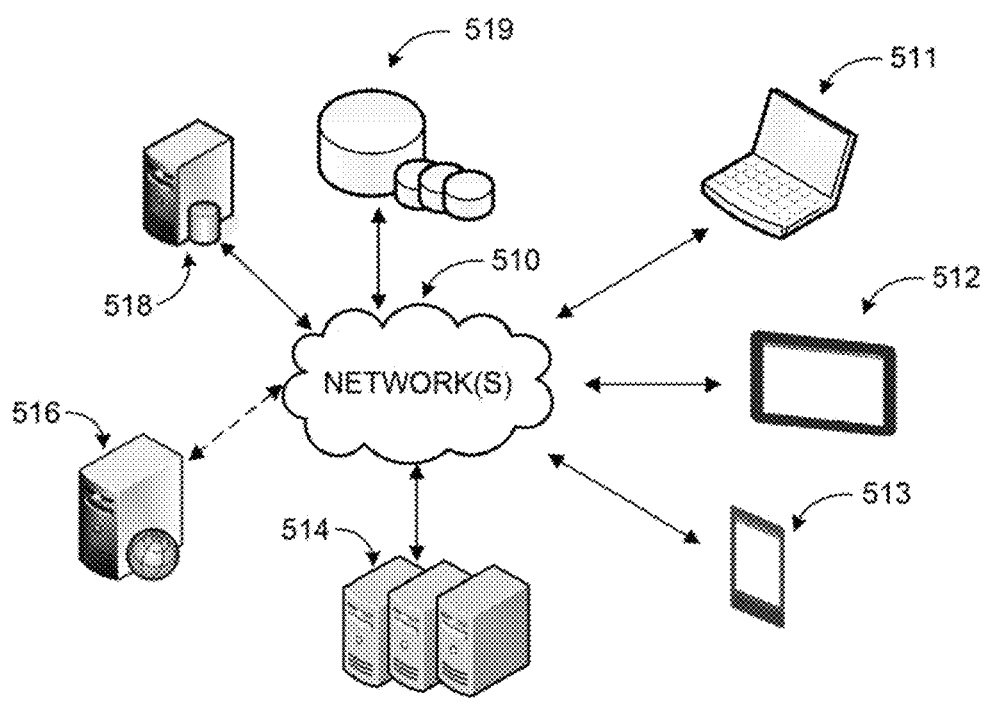
FIG. 5 is a simplified networked environment where a system according to embodiments may be implemented.

FIG. 5 is an example networked environment, where embodiments may be implemented. An application or service configured to provide personalized search environment to users without requiring enterprise environment access may be implemented via software executed over one or more servers 514 such as a hosted service. The platform may communicate with client applications on individual computing devices such as a smart phone 513, a mobile computer 512, or desktop computer 511 ('client devices') through network(s) 510.

Applications executed on any of the client devices 511-513 may facilitate communications via applications) executed by servers 514, or on individual server 516. As discussed above, personalized searches may be performed based on a aggregation service backbone in personal and/or enterprise environments of users without requiring enterprise environment access. The service may store data associated with the feature in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such, as Public Switched Telephone Network (PSTN) or cellular networks. Furthermore, network(s) 510 may include short range wireless networks such as Bluetooth or similar ones. Network(s) 510 provide Communication between the nodes described herein. By way of example, and not limitation, network(s) 510 may include wireless media such as acoustic, RF, infrared and other wireless media.

Many other configurations of computing devices, applications, data sources, and data distribution systems may be employed to provide personalized search environment to users without requiring enterprise environment access. Furthermore, the networked environments discussed in FIG. 5 are for illustration purposes only. Embodiments are not limited to the example applications, modules, or processes.

Figure 6:
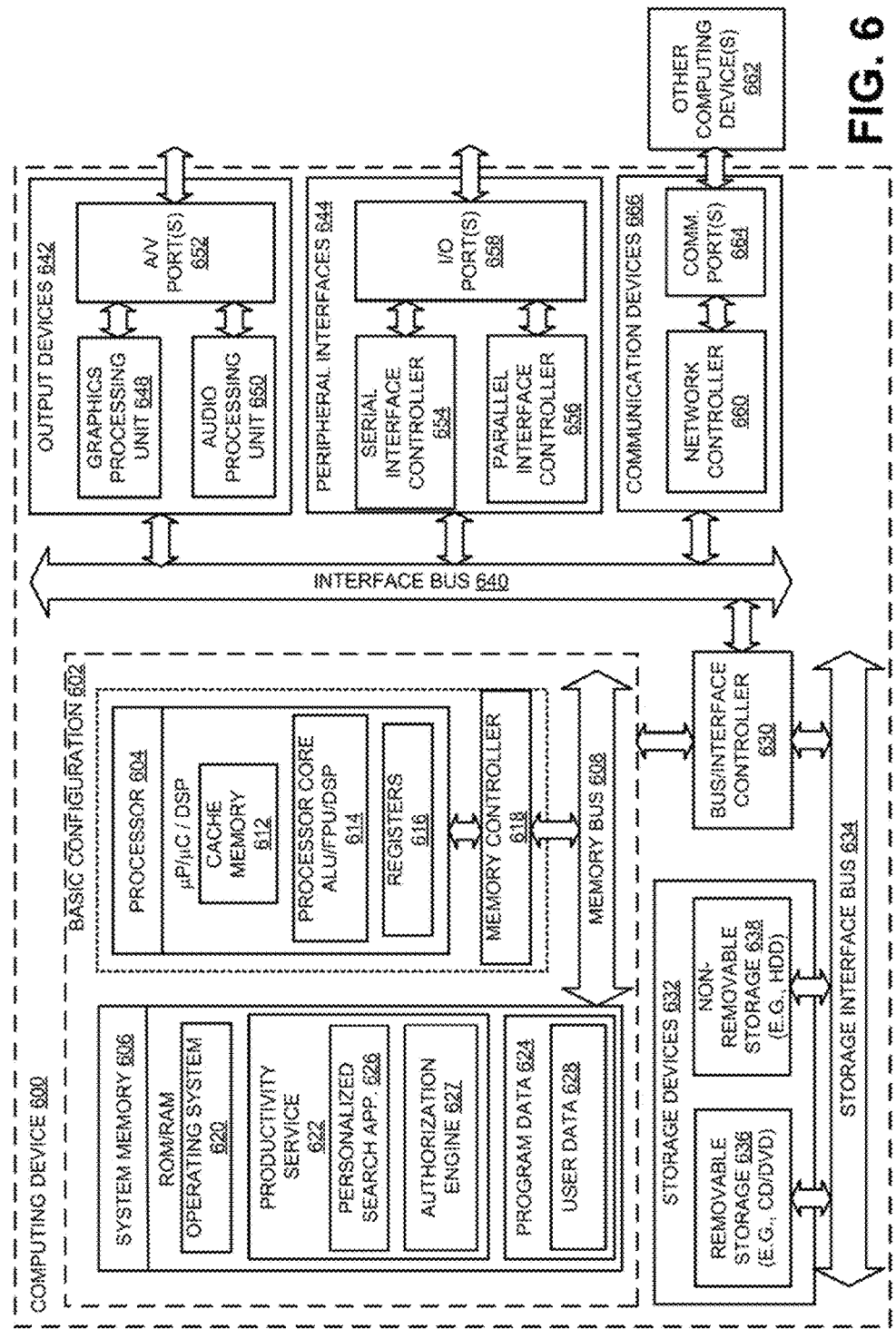
FIG. 6 is a block diagram of an example computing device, which may be used to provide personalized search environment to users without requiring enterprise environment access, according to embodiments.

FIG. 6 is a block diagram of an example computing device, which may be used to provide personalized search environment to users without requiring, enterprise environment access, according to embodiments.

For example, computing device 600 may be used, as a server, desktop computer, portable computer, smart phone, special purpose computer, or similar device. In an example basic configuration 602, the computing device 600 may include one or more processors 604 and a system memory 606. A memory has 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash, memory, etc.), or any combination thereof. The system memory 606 may include an operating system 620, a productivity service 622, and a program data 624. The productivity service 622 may include components such as a personalized search application 626 and an authorization engine 627. The authorization engine 627 may allow a user to access personalized search service provided by the personalized search application 622 without requiring access through the enterprise environment as described herein.

The program data 624 may also include, among other data, user data 628, or the like, as described herein. The user data 628 may include the search results, user relevancy data, other user associated data, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication, from various interface devices (for example, one or more output devices 642, one or more peripheral interfaces 644, and one or more communication de vices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication devices(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link, may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide personalized search environment to users without requiring enterprise environment access. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
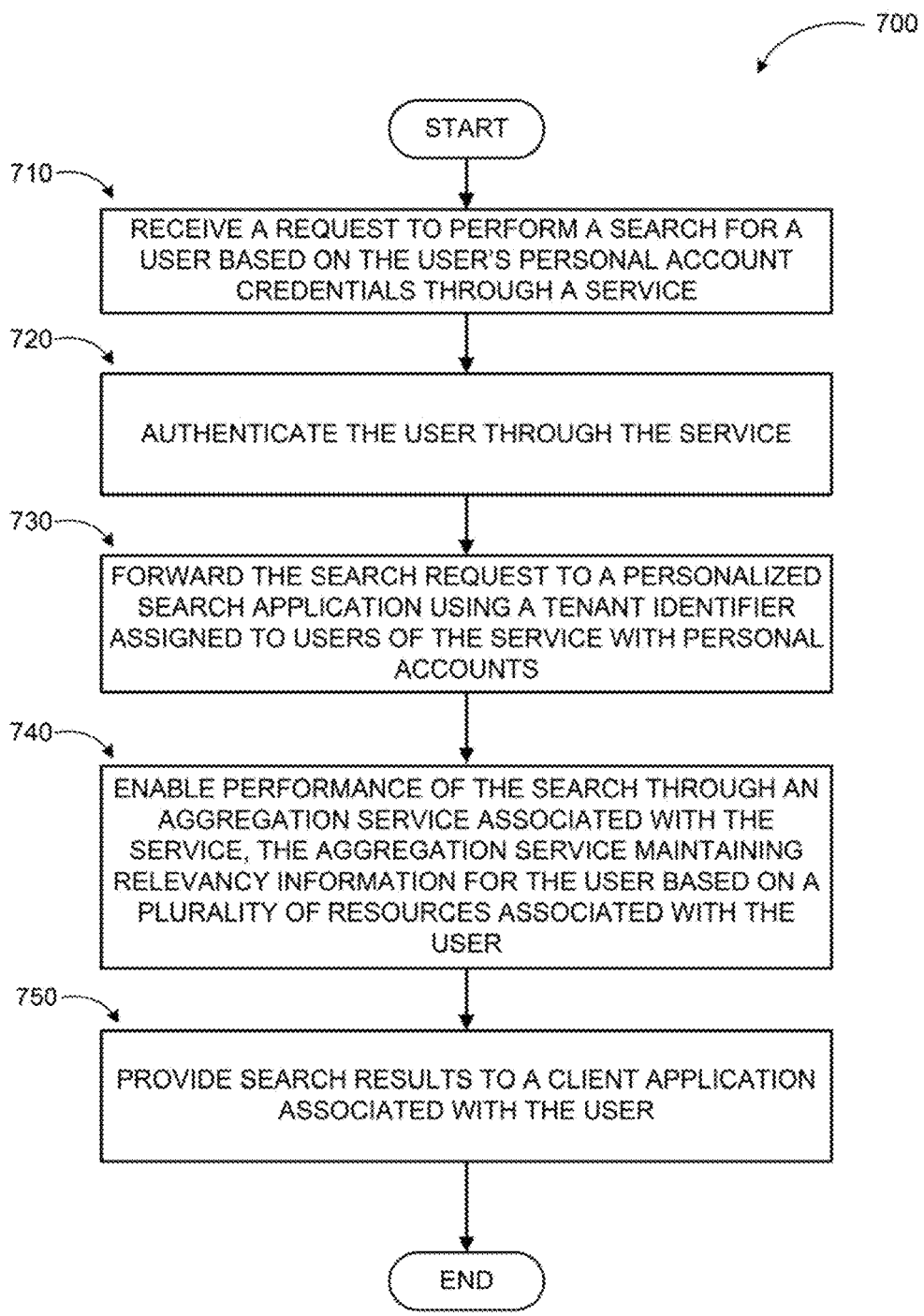
FIG. 7 is a logic flow diagram illustrating a process for providing personalized search environment to users without requiring enterprise environment access, according to embodiments.

FIG. 7 is a logic flow diagram illustrating a process for providing personalized search environment to users without requiring enterprise environment access, according to embodiments. Process 700 may be implemented on a computing device, such as the computing device 600 or another system.

Process 700 begins with operation 710, where a request to perform a search for a user may be received based on the user's personal account credentials through a service. The service may include an operating system based account, management service, a productivity service, a collaboration service, a communication service, a personal network service, or similar ones. At operation 720, the user may be authenticated through the service and the search request may be forwarded to a personalized search application using a tenant identifier assigned to all users of the service with personal accounts at operation 730.

At operation 740, the search may be performed through an aggregation service associated with the service, where the aggregation service maintains relevancy information for the user based on a plurality of resources associated with the user as discussed herein. The search results may be provided to a client application associated with the user at operation 750.

The operations included in process 700 is for illustration purposes. Providing personalized search environment to users without requiring enterprise environment access may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing a personalized search environment to users through their personal accounts is described. The means may include a means for receiving a request to perform a search for a user based on the user's personal account credentials through a service; a means for authenticating the user through the service; forwarding the search request to a personalized search application using a tenant identifier assigned to users of the service with personal accounts; a means for enabling performance of the search through an aggregation service associated with the service, where the aggregation service maintains relevancy information for the user based on a plurality of resources associated with the user; and a means for providing search results to the user.

According to some examples, a server to provide a personalized search environment to users through their personal accounts is described. The server may include a communication interface configured to facilitate communication with other computing devices; a memory configured to store instructions associated with a hosted service; and one or more processors coupled to the memory and the communication interface, the one or more processors executing personalized search application in conjunction with the instructions stored in the memory. The personalized search application may include an authorization engine configured to receive a request to perform a search for a user based on the user's personal account credentials through a service; forward the request to an authentication module of the service using a tenant identifier assigned to users of the service with personal accounts; and receive an access token from the authentication module. The personalized search application may also include a search engine configured to perform the search through an aggregation service associated with the service, where the aggregation service maintains relevancy information for the user based on a plurality of resources associated with the user; and provide search results to a client application associated with the user.

According to other examples, the service may include an operating system based account management service, a productivity service, a collaboration service, a communication service, or a personal network service. The personalized search application and the aggregation service may be components of the service. The personalized search application may be a third party service independent from the service. The relevancy information may include a graph based date infrastructure with nodes representing documents, users, and other date, and edges connecting the nodes representing a connection between each pair of data points. The plurality of resources may include one or more of a productivity service, a collaboration service, a communication service, a personal network, a gaming application, a health service, m online data storage service, a calendar service, and a task list service.

According to further examples, the aggregation service may be configured to maintain data associated with other users based on a relationship of the other users to the user. The relationship of the other users to the user may be determined based on information received from one or more of the plurality of resources. The search engine may be further configured to receive complement search results with results of a search in an enterprise environment associated with the user. The authorization engine may be further configured to receive credentials associated with an enterprise account and authenticate the user for access to the enterprise account prior to the search results being complemented. The authorization engine may also be configured to associate the enterprise account with the personal account of the user; and automatically authenticate the user for access to the enterprise account for subsequent search requests.

According to other examples, a method executed on a computing device to provide a personalized search environment to users through their personal accounts is described. The method may include receiving a request to perform a search for a user based on the user's personal account credentials through a service; authenticating the user through the service; forwarding the search request to a personalized search application using a tenant identifier assigned to users of the service with personal accounts; enabling performance of the search through an aggregation service associated with the service, where the aggregation service maintains relevancy information for the user based on a plurality of resources associated with the user; and providing search results to the user.

According to some examples, the method may also include upon receiving the request, performing an authentication that includes a personalized search application secret, where authentication parameters include one or more of a client identifier for the personalized search application, a redirect link to the personalized search application, a scope for the request, and a response type. The method may further include in response to receiving the request, directing a user agent to an account authorization endpoint of the service; and upon successful authorization, receiving a redirect to the personalized search application address.

According to yet other examples, the method may include requesting an access token from a token endpoint of the service by using client credentials associated with the user service for authentication, wherein the request includes an authorization code received with the redirect. The method may further include including a redirection link used to obtain the authorization code in the request for the access token for verification. The method may also include receiving the access token upon validation of the client credentials and the authorization code, and the verification of the redirection link from an account authorization server of the service.

According to farther examples, a computer-readable memory device with instructions stored thereon to provide a personalized search environment to users through their personal accounts is described. The instructions may include receiving a request to perform a search for a user based on the user's personal account credentials through an operating system based account management service; authenticating the user through an account authorization server of the operating system based account management service; forwarding the search request to a personalized search application using a tenant identifier assigned to at least a subset of users of the operating system, based account management service with personal accounts; enabling performance of the search in a personalized search environment for the user through an aggregation service associated with the operating system based account management service, where the aggregation service is configured to maintain a graph based data Infrastructure with nodes representing documents, users, and other data, and edges connecting the nodes representing a connection between each pair of data points for the user based on a plurality of resources associated with the user; and providing search results to the user.

According to other examples, the plurality of resources may include one or more of a productivity service, a collaboration service, a communication service, a personal network, a gaming application, a health service, an online data storage service, a calendar service, and a task list service; and the aggregate service may be configured to determine the connection between each pair of data points based on information associated with the user and other users provided by the plurality of resources. The instructions may further include receiving credentials associated with an enterprise account; associating the enterprise account with the personal account of the user upon authentication of the user for access to the enterprise account; and automatically authenticating the user for access to the enterprise account for subsequent search requests to include an enterprise environment in the search.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide a personalized search environment to users through their personal accounts, the method comprising:
   receiving a request to perform a search for a user based on
      the user's credentials of a personal account of a cloud-based service to which the user subscribes, the user having a tenant identifier corresponding to the cloud-based service, wherein the tenant identifier is assigned to the user and other users subscribing to the same cloud-based service by treating the user and the other users as members of an enterprise in order to receive complement search results from an enterprise environment associated with the enterprise;

authenticating the user through the cloud-based service based on the credentials of the personal account;

upon authentication the user through the cloud-based service based on the credentials of the personal account, forwarding the search request to a personalized search application using the tenant identifier assigned to the user and the other users of the cloud-based service all with a corresponding personal account with the cloud-based service;

enabling performance of the search through an aggregation service associated with the cloud-based service, wherein the aggregation service maintains relevancy information aggregated from a plurality of resources associated with the user and with the other users of the same cloud-based service based on the assigned tenant identifier; and providing search results of performance of the search to the user.

2. The method of claim 1, further comprising:

upon receiving the request, performing an authentication that includes a personalized search application secret, wherein authentication parameters include one or more of a client identifier for the personalized search application, a redirect link to the personalized search application, a scope for the request, and a response type.

3. The method of claim 1, further comprising:

in response to receiving the request, directing a user agent to an account authorization endpoint of the cloud-based service; and upon successful authorization, receiving a redirect to the personalized search application address.

4. The method of claim 3, further comprising:

requesting an access token from a token endpoint of the cloud-based service by using client credentials associated with the user for authentication, wherein the request includes an authorization code received with the redirect.

5. The method of claim 4, further comprising:

including a redirection link used to obtain the authorization code in the request for the access token for verification.

6. The method of claim 5, further comprising:

receiving the access token upon validation of the client credentials and the authorization code, and the verification of the redirection link from an account authorization server of the service.

7. A method executed on a computing device to provide a personalized search environment to users having corresponding personal accounts with a cloud-based service, the method comprising:

receiving, from a user of the cloud-based service, a search request to perform a search based on personal account credentials of the user to the cloud-based service;

authenticating the user through the cloud-based service using the personal account credentials of the user; and upon successful authentication based on the personal account credentials of the user, associating the received search request with a tenant identifier corresponding to the cloud-based service, wherein the tenant identifier is assigned to the user and other users individually having a personal account with the same cloud-based service by treating the user and the other users as members of a user group in order to receive complement search results from an enterprise environment associated with the user group;

forwarding, to a search application, the received search request with the associated tenant identifier;

performing, with the search application, the requested search based on relevancy information of the user group aggregated from additional cloud-based services provided to the user and the other users associated with the tenant identifier based on the corresponding personal accounts; and providing search results from the performed search to the user.

8. The method of claim 7 wherein the relevancy information includes a graph based data infrastructure with nodes representing documents, the user, and the other users associated with the tenant identifier with edges individually connecting the nodes representing a connection between each pair of nodes.

9. The method of claim 7 wherein the plurality of resources include one or more of a productivity service, a collaboration service, a communication service, a personal network, a gaming application, a health service, an online data storage service, a calendar service, or a task list service.

10. The method of claim 7 wherein relevancy information of the user is aggregated from additional cloud-based services of the user and of the other users based on a relationship of the other users to the user.

11. The method of claim 7, further comprising:

receiving complement search results from an enterprise environment associated with the user, the enterprise environment being separate from the personalized search environment; and wherein providing search results includes providing the search results from the performed search in the personalized search environment and the received complement search results from the enterprise environment.

12. The method of claim 7, further comprising:

receiving credentials associated with an enterprise account of the user in an enterprise environment;

authenticating the user for access to the enterprise environment using the received credentials associated with the enterprise account of the user; and upon successful authentication using the received credentials associated with the enterprise account of the user, receiving complement search results from the enterprise environment associated with the user, the enterprise environment being separate from the personalized search environment.

13. The method of claim 7, further comprising:

receiving credentials associated with an enterprise account of the user in an enterprise environment;

associating the enterprise account with the personal account of the user; and automatically authenticating the user for access to the enterprise account for subsequent search requests.

14. A computing device configured to provide a personalized search environment to users having corresponding personal accounts with a cloud-based service, the computing device comprising:

a processor; and a memory operatively coupled to the processor, the memory containing instructions executable by the processor to cause the computing device to:

upon receiving, from a user of the cloud-based service, a search request to perform a search based on personal account credentials of the user to the cloud-based service, authenticate the user through the cloud-based service using the personal account credentials of the user; and upon successful authentication based on the personal account credentials of the user, associate a tenant identifier to the received search request, the tenant identifier corresponding to the cloud-based service, the tenant identifier being assigned to the user and other users individually having a personal account with the same cloud-based service by treating the user and the other users as members of a user group in order to receive complement search results from an enterprise environment associated with the user group;

forward, to a search engine, the received search request with the associated tenant identifier;

receive, from the search engine, search results of the requested search based on relevancy information of the user group aggregated from additional cloud-based services provided to the user and of the other users assigned with the tenant identifier based on the corresponding personal accounts; and provide the received search results to the user.

15. The computing device of claim 14 wherein the relevancy information includes a graph based data infrastructure with nodes representing documents, the user, and the other users associated with the tenant identifier with edges individually connecting the nodes representing a connection between each pair of nodes.

16. The computing device of claim 14 wherein the relevancy information of the user is aggregated from additional cloud-based services of the user and of the other users based on a relationship of the other users to the user.

17. The computing device of claim 14 wherein the memory contains additional instructions executable by the processor to cause the computing device to:

receive complement search results from an enterprise environment associated with the user, the enterprise environment being separate from the personalized search environment; and wherein to provide the search results includes to provide the search results from the performed search in the personalized search environment and the received complement search results from the enterprise environment.

18. The computing device of claim 14 wherein the memory contains additional instructions executable by the processor to cause the computing device to:

receive credentials associated with an enterprise account of the user in an enterprise environment;

authenticate the user for access to the enterprise environment using the received credentials associated with the enterprise account of the user; and upon successful authentication using the received credentials associated with the enterprise account of the user, receive complement search results from the enterprise environment associated with the user, the enterprise environment being separate from the personalized search environment.

19. The computing device of claim 14 wherein the memory contains additional instructions executable by the processor to cause the computing device to:

receive credentials associated with an enterprise account of the user in an enterprise environment;

associate the enterprise account with the personal account of the user; and automatically authenticate the user for access to the enterprise account.

20. The computing device of claim 14 wherein the memory contains additional instructions executable by the processor to cause the computing device to:

receive credentials associated with an enterprise account of the user in an enterprise environment;

associate the enterprise account with the personal account of the user;

automatically authenticate the user for access to the enterprise account; and upon successful authentication using the received credentials associated with the enterprise account of the user, receive complement search results from the enterprise environment associated with the user, the enterprise environment being separate from the personalized search environment.

* * * * *